United States Patent
Yu et al.

(10) Patent No.: US 9,538,166 B2
(45) Date of Patent: Jan. 3, 2017

(54) APPARATUS AND METHOD FOR MEASURING DEPTH OF THE THREE-DIMENSIONAL IMAGE

(71) Applicant: SK PLANET CO., LTD., Seoul (KR)

(72) Inventors: Tae Ho Yu, Seongnam-si (KR); Joo Hyoung Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 404 days.

(21) Appl. No.: 14/305,660

(22) Filed: Jun. 16, 2014

(65) Prior Publication Data

US 2014/0293021 A1    Oct. 2, 2014

Related U.S. Application Data

(63) Continuation of application No. PCT/KR2012/010210, filed on Nov. 29, 2012.

(30) Foreign Application Priority Data

Dec. 16, 2011 (KR) ........................ 10-2011-0136260

(51) Int. Cl.
*H04N 13/00* (2006.01)
*H04N 13/04* (2006.01)

(52) U.S. Cl.
CPC ...... *H04N 13/0484* (2013.01); *H04N 13/0425* (2013.01)

(58) Field of Classification Search
CPC .......................... H04N 13/0484; H04N 13/0425
USPC ......................................................... 348/51
See application file for complete search history.

(56) References Cited

U.S. PATENT DOCUMENTS

| 6,201,517 B1* | 3/2001 | Sato ................... G02B 27/2228 345/51 |
| 2013/0050642 A1* | 2/2013 | Lewis ................... A61B 3/113 351/204 |

FOREIGN PATENT DOCUMENTS

| JP | 2011205195 A | 10/2011 |
| KR | 1020060134309 A | 12/2006 |
| KR | 100820639 B1 | 1/2008 |
| KR | 1020100076461 A | 7/2010 |
| KR | 1020110121794 A | 11/2011 |

OTHER PUBLICATIONS

International Search Report mailed Feb. 14, 2013 for PCT/KR2012/010210.

* cited by examiner

*Primary Examiner* — Jeffery Williams
(74) *Attorney, Agent, or Firm* — Hauptman Ham, LLP

(57) ABSTRACT

An apparatus for measuring a depth of a 3D image includes a display panel unit which produces a 3D image by displaying a left-eye and a right-eye image, a depth measurement unit which measures projecting distances or recessed distances of the 3D image and a real object, a parallax measurement unit which measures a distance between pupils of an experimenter based on the projecting distances or recessed distances of the 3D image and the real objects, and a depth value calculation unit which calculates an average value of the projecting distances or recessed distances of the real object with respect to a plurality of experimenters measured when a change in distance between pupils is the same as a change in distance between pupils measured by adjusting the projecting distance or recessed distance of the 3D image, and determines the calculated average value as a depth value of the 3D image.

9 Claims, 2 Drawing Sheets

APPARATUS AND METHOD FOR MEASURING DEPTH OF THE THREE-DIMENSIONAL IMAGE

CROSS REFERENCE TO RELATED APPLICATION

The present application is a continuation of International Patent Application No. PCT/KR2012/010210, filed Nov. 29, 2012, which claims priority to Korean Patent Application No. 10-2011-0136260, filed on Dec. 16, 2011. The disclosures of the above-listed application are hereby incorporated by reference herein in their entirely.

TECHNICAL FIELD

The present invention relates to an apparatus and method for measuring the depth of a three-dimensional (3D) image and, more particularly, to an apparatus and method for measuring the depth of a 3D image by measuring a change in distance between pupils according to a change in depth of a 3D image and determining a projecting or recessed distance of a real object at a point where the measured change in the distance between the pupils is the same as a change in distance between pupils measured by varying the depth of the real object as a depth value of the 3D image, thus quantitatively representing the depth of the 3D image.

BACKGROUND ART

In general, 3D image display techniques create a 3D effect of an object using binocular parallax as the most important factor that causes the 3D effect at a short distance.

Such 3D image display devices are generally divided into stereoscopic 3D image display devices and autostereoscopic 3D image display devices depending on the use of special glasses.

The stereoscopic 3D image display device requires a viewer to wear special glasses, which is inconvenient for the viewer, but in the case of the autostereoscopic 3D image display device, the viewer can feel the 3D effect only by directly viewing a screen, by which the drawbacks of the stereoscopic 3D image display device can be obviated. Accordingly, extensive research on the autostereoscopic 3D image display device has been conducted, and new products have recently been released.

The autostereoscopic 3D image display devices are generally divided into a lenticular method and a parallax-barrier method.

The lenticular method refers to a method of vertically arranging cylindrical lenses, in which a left image and a right image in units of vertical cells (R, G and B) are alternately arranged in the vertical direction (vertical interlace method) and specifically-designed refractive lenses are mounted in front of the left and right images, respectively, to separate the left and right images, thus providing a 3D image.

The parallax-barrier method refers to a method of dividing pixels of a display panel into left-eye pixels and right-eye pixels in units of R, G and B pixels (vertical interlace method) and providing a barrier substrate at each point corresponding to a gap between the left-eye pixels and the right-eye pixels at a predetermined distance from the left-eye pixels and the right-eye pixels such that the left-eye image is viewed only by a left eye and the right-eye image is viewed only by a right eye, thus reproducing the 3D image.

As such, the viewer feels the protrusion or depth of the image by combining the left and right images input to the left and right eyes, and thus it is difficult to quantify the depth of the 3D image as an objective numerical value.

DISCLOSURE

Technical Problem

Accordingly, the present invention has been made to solve the above-described problems, and an object of the present invention is to an apparatus and method for measuring the depth of a three-dimensional (3D) image by measuring a change in distance between pupils according to a change in depth of a 3D image and determining a projecting or recessed distance of a real object at a point where the measured change in the distance between the pupils is the same as a change in distance between pupils measured by varying the depth of the real object as a depth value of the 3D image, thus quantitatively representing the depth of the 3D image.

Technical Solution

In one aspect, the present invention provides an apparatus for measuring the depth of a three-dimensional (3D) image, the apparatus comprising: a display panel unit which produces a 3D image by displaying a left-eye image and a right-eye image; a depth measurement unit which measures projecting distances or recessed distances of the 3D image and a real object; a parallax measurement unit which measures a distance between pupils of an experimenter based on the projecting distances or recessed distances of the 3D image and the real objects; and a depth value calculation unit which calculates an average value of the projecting distances or recessed distances of the real object with respect to a plurality of experimenters, which are measured when a change in distance between pupils is the same as a change in distance between pupils measured by adjusting the projecting distance or recessed distance of the 3D image, and determines the calculated average value as a depth value of the 3D image.

The apparatus for measuring the depth of the 3D image may further comprise a memory which stores the projecting distances or recessed distances of the 3D image and the real object, the distance between the pupils, and the depth value of the 3D image.

Moreover, the depth measurement unit measures the projecting distance or recessed distance of the 3D image produced by the display panel unit using light beams, which are parallel to the display panel unit and arranged at a constant interval from the display panel unit, and measures the projecting distance or recessed distance of the real object by moving the real object with respect to the display panel unit.

Furthermore, the parallax measurement unit measures the distance between the pupils of both eyes by taking an image of the eyes of the experimenter by a precision camera.

In addition, the depth measurement unit measures the projecting distances or recessed distances of the 3D image and the real object with respect to the display panel unit, and the depth value calculation unit measures the change in the distance between the pupils based on a distance between pupils when the 3D image or the real object is located on the display panel unit.

In one aspect, the present invention provides a method for measuring the depth of a three-dimensional (3D) image, the method comprising the steps of: (a) measuring a projecting distance or recessed distance of a 3D image projecting from or recessed into a display panel unit and a change in distance between pupils; (b) measuring a projecting distance or recessed distance of a real object when a change in distance between pupils is the same as the measured change in the distance between the pupils by moving the real object from the display panel unit; and (c) calculating an average value of the projecting distances or recessed distances of the real object with respect to a plurality of experimenters, which are measured in steps (a) and (b), and determining the calculated average value as a depth value of the 3D image.

Step (a) comprises the steps of: (a-1) displaying, at the display panel unit, a 3D image including a left-eye image and a right-eye image; (a-2) outputting light beams parallel to the display panel unit and arranged at a constant interval from the display panel unit; (a-3) measuring the projecting distance or recessed distance of the 3D image produced by the display panel unit using the light beams; and (a-4) measuring a change in distance between pupils of an experimenter viewing the 3D image.

Step (b) comprises the steps of: (b-1) measuring a distance between pupils when the real object is located on the display panel unit; (b-2) measuring a change in distance of pupils of an experimenter by moving the real object to project from or to be recessed into the display panel unit; and (b-3) measuring a distance of the projecting distance or recessed distance of the real object when the measured change in the distance between the pupils coincides with the change in the distance between the pupils of the 3D image.

In step (a) or (b), the change in the distance between the pupils is calculated by measuring the distance between the pupils of both eyes by taking an image of the eyes of the experimenter by a precision camera.

Advantageous Effects

The apparatus and method for measuring the depth of the 3D image according to the present invention can quantitatively measure the depth of a 3D image representing a 3D effect when a viewer feels the 3D effect by binocular parallax when viewing the 3D image including a left-eye image and a right-eye image.

Moreover, the apparatus and method for measuring the depth of the 3D image according to the present invention can be applied to various application products through the quantification of numerical values with respect to the depth of the 3D image and can adjust the depth of the 3D image more precisely using the quantified depth value.

MODE FOR INVENTION

Figure 1:
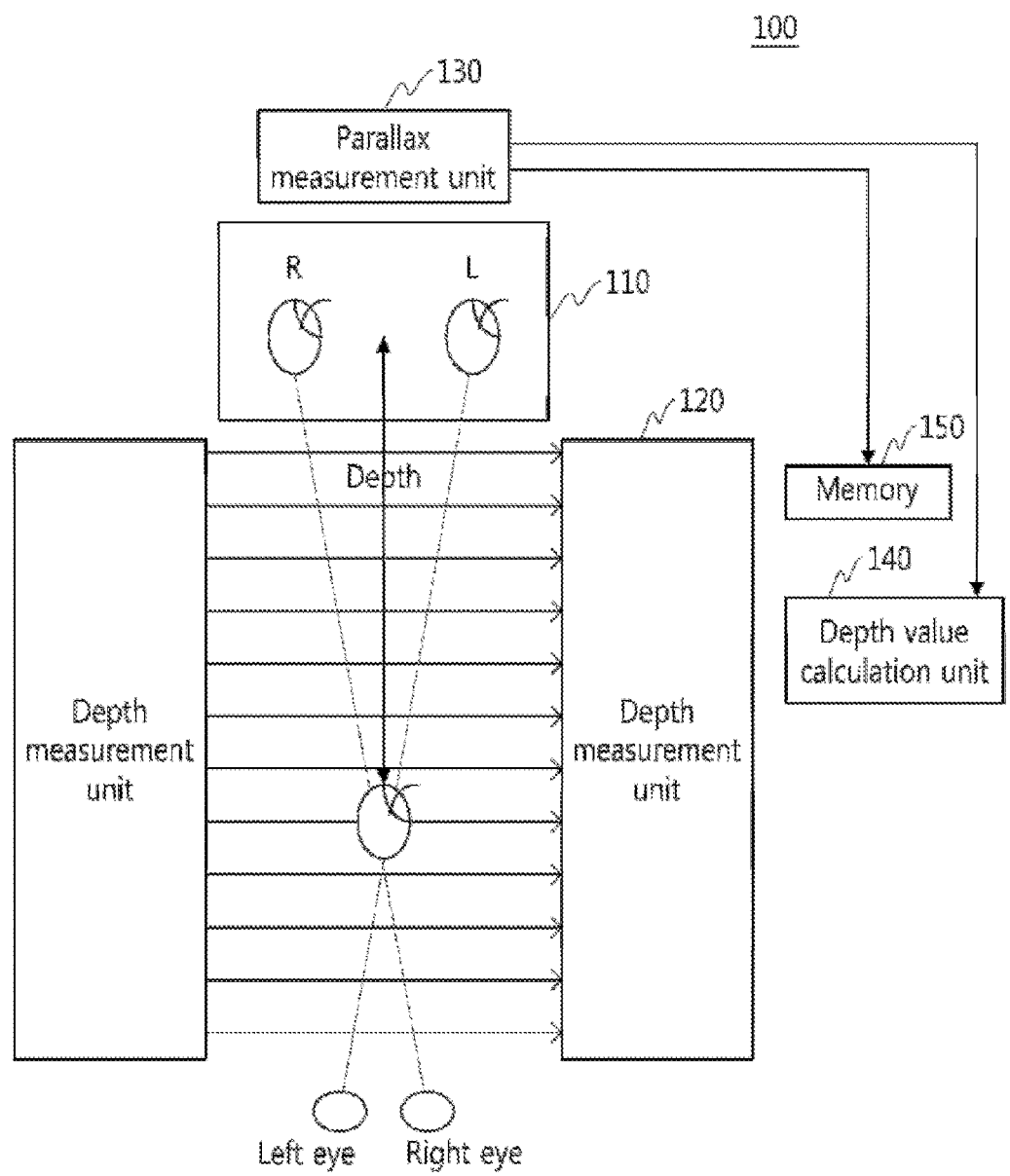
FIG. 1 is a configuration diagram showing an embodiment of an apparatus for measuring the depth of a 3D image in accordance with an aspect of the present invention.

Hereinafter, preferred embodiments in accordance with the present invention will be described with reference to the accompanying drawings. In describing the present invention, the same or corresponding elements are given the same reference numerals and a repetitive description thereof will be omitted.

First, in the present invention, the term "depth" is defined as a projecting distance or recessed distance from a reference plane where the depth value is 0 with respect to a 3D image.

In general, a display screen on which the 3D image is displayed is defined as a reference plane where the depth value is 0.

FIG. 1 is a configuration diagram showing an embodiment of an apparatus for measuring the depth of a 3D image in accordance with an aspect of the present invention.

As shown in FIG. 1, an apparatus 100 for measuring the depth of a 3D image according to the present invention may comprise a display panel unit 110, a depth measurement unit 120, a parallax measurement unit 130, and a depth value calculation unit 140 and may further comprise a memory 150.

The display panel unit 110 represents an image display device which produces a 3D image by displaying a left-eye image and a right-eye image and may be implemented in various forms such as a screen, monitor, projector, etc.

For example, the display panel unit 110 may be implemented as an autostereoscopic 3D LCD device and displays a 3D image by displaying a left-eye image and a right-eye image through left-eye pixels L and right-eye pixels R, respectively.

Here, the surface of the display panel unit 110 represents a reference plane where the depth value of the 3D image is 0. In the case where the depth value increases toward an experimenter with respect to the surface of the display panel unit 110, it is defined as it seems to be projecting, and in the case where the depth value increases away from the experimenter with respect to the surface of the display panel unit 110, it is defined as it seems to be recessed.

The depth measurement unit 120 measures a projecting distance or recessed distance of a 3D image and a projecting distance or recessed distance of a real object, respectively.

As shown in FIG. 1, the depth measurement unit 120 may measure the projecting distance or recessed distance of the 3D image using light beams output from the depth measurement unit 120 disposed at one end of the display panel unit 110 and incident to the other end.

That is, the light beams generated by the depth measurement unit 120 are parallel to the display panel unit 110 and arranged at a constant interval from the display panel unit 110, and various materials capable of displaying a layer in a space together with the 3D image may be used.

For example, the depth measurement unit 120 may display a layer by arranging red or green laser beams at an interval of a few centimeters.

Measurement gradations indicating the distance of a point from or to which the light beams are output or incident are provided on one side of the depth measurement unit 120 such that the experimenter can directly input the projecting distance or recessed distance of the 3D image or the projecting distance or recessed distance of the 3D image can be measured by analyzing a physical response of the experimenter.

Moreover, the depth measurement unit 120 may measure a projecting distance or recessed distance of a real object by moving the real object similar to an object of the 3D image with respect to the display panel unit 110. It is preferable that the measurement of the projecting distance or recessed distance of the real object be performed under conditions similar to 3D image viewing conditions.

The parallax measurement unit 130 measures a distance between pupils of an experimenter based on the projecting distances or recessed distances of the 3D image and the real object.

The parallax measurement unit 130 may measure the distance between the pupils of both eyes by taking an image of the eyes of the experimenter by a precision camera. Otherwise, in the case where the depth of the 3D image or real object is 0, the parallax measurement unit 130 may measure the distance between the pupils, set the measured distance as a reference distance between the pupils, and measure the change in the distance between the pupils according to the movement of the 3D image or real object.

The depth value calculation unit 140 calculates an average value of the projecting distances or recessed distances of the real object with respect to a plurality of experimenters, which are measured when the change in the distance between the pupils is the same as the change in the distance between the pupils measured by adjusting the projecting distance or recessed distance of the 3D image, and determines the calculated average value as a depth value of the 3D image.

The depth measurement unit 120 and the parallax measurement unit 130 may measure the change in the distance between the pupils according to the projecting distance or recessed distance of the 3D image or the real object with respect to the plurality of experimenters.

The depth value calculation unit 140 selects one of the plurality of measured projecting distances or recessed distances of the 3D image, selects a changes in distance between pupils from those of the plurality of experimenters, which corresponds to the selected projecting distance or recessed distance of the 3D image, and searches for the projecting or recessed distance of the real object with the same change in the distance of the pupils.

The depth value calculation unit 140 calculates an average value of the projecting distances or recessed distances of the real object with respect to the plurality of experimenters and determines the calculated average value as a depth value of the selected 3D image.

Accordingly, the apparatus for measuring the depth of the 3D image according to the present invention can measure the projecting distance or recessed distance of the 3D image with respect to the plurality of experimenters when they directly view the 3D image and represent the measured distance as a quantified depth value.

Moreover, the apparatus for measuring the depth of the 3D image according to the present invention can select one of the plurality of projecting distances or recessed distances of the 3D image measured from the plurality of experimenters, select a change in distance between pupils from those of the plurality of experimenters, which corresponds to the selected projecting distance or recessed distance of the 3D image, calculate an average value of the projecting distances or recessed distances of the real object with the same change in the distance of the pupils, and quantify the calculated average value as a depth value of the 3D image.

The apparatus 100 for measuring the depth of the 3D image may further comprise the memory 150 storing the projecting distances or recessed distances of the 3D image and the real object, the distance between the pupils, and the depth value of the 3D image.

Figure 2:
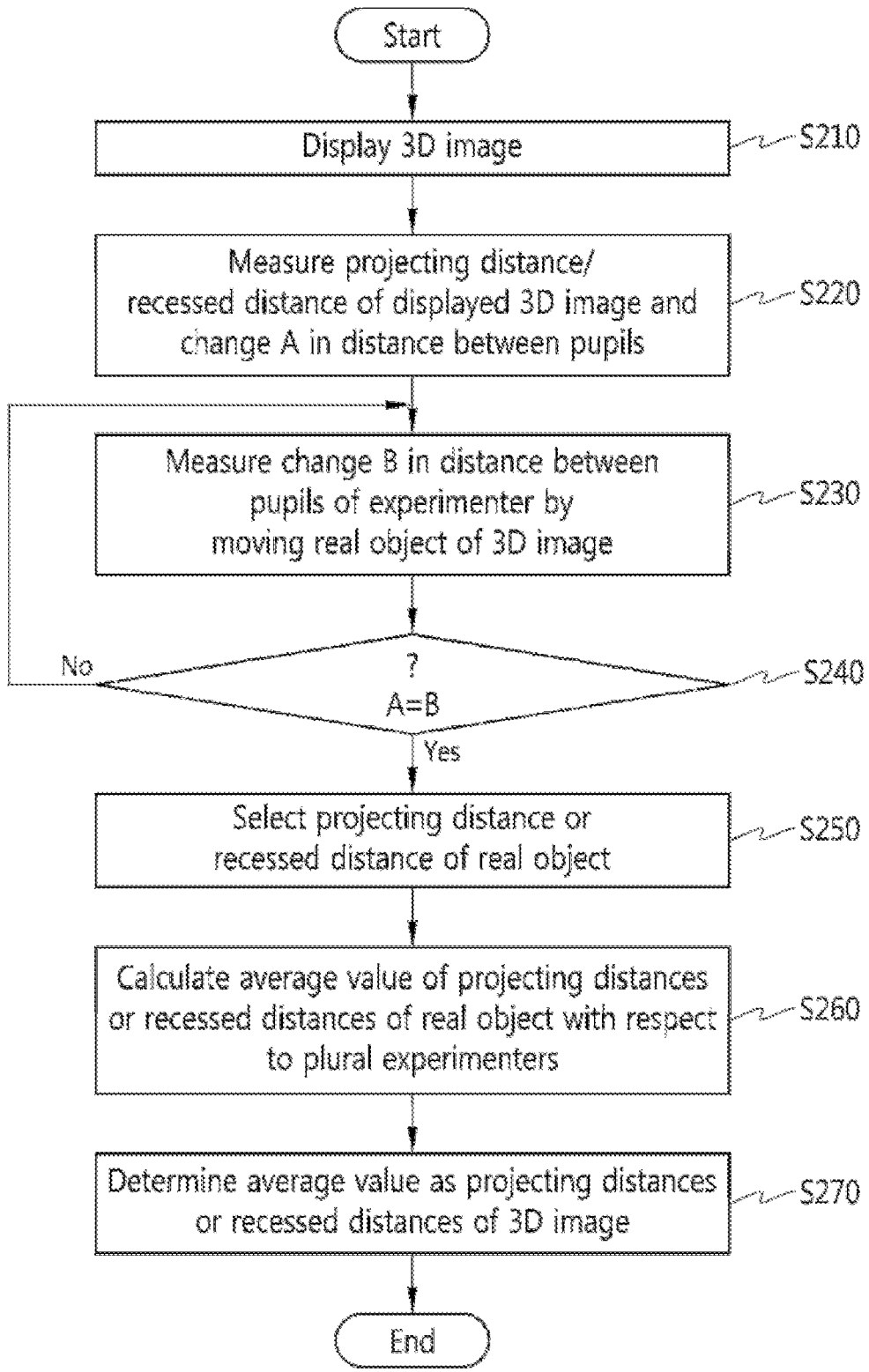
FIG. 2 is a flowchart showing an embodiment of a method for measuring the depth of a 3D image in accordance with another aspect of the present invention.

FIG. 2 is a flowchart showing an embodiment of a method for measuring the depth of a 3D image in accordance with another aspect of the present invention.

As shown in FIG. 2, a method for measuring the depth of a 3D image according to the present invention displays a 3D image through a display panel unit (S210) and measures, at a depth measurement unit, a projecting distance or recessed distance of the displayed 3D image and a change A in distance between pupils (S220).

Here, the change A in the distance between the pupils during viewing of the 3D image is measured using the changed distance between the pupils based on the distance between the pupils viewing a display screen.

Then, the method measures a change B in distance between pupils of an experimenter by moving a real object that is the same as or similar to the 3D image from the screen (S230) and compares the change A in the distance between the pupils during viewing of the 3D image and the change B in the distance between the pupils during viewing the real object (S240).

When the change A in the distance between the pupils during viewing of the 3D image and the change B in the distance between the pupils during viewing the real object are different from each other, the method re-measures the change B in the distance between the pupils by further moving the real object (S230) and compares whether the measured change B in the distance between the pupils is the same as the change A in the distance between the pupils during viewing of the 3D image.

Steps S230 to S240 are repeatedly performed until the change A in the distance between the pupils during viewing of the 3D image and the change B in the distance between the pupils during viewing the real object are the same.

When the change A in the distance between the pupils during viewing of the 3D image and the change B in the distance between the pupils during viewing the real object are the same, the method selects the projecting distance or recessed distance of the real object (S250).

Then, the method calculates an average value of the projecting distances or recessed distances of the real object with respect to a plurality of experimenters, which are obtained by repeating steps S210 to S250 (S260).

A depth value calculation unit determines the calculated average value with respect to the plurality of experimenters as a depth value of the 3D image (S270), thus objectifying and quantifying the calculation of the 3D depth value.

The measurement of the projecting distance or recessed distance of the displayed 3D image (S220) may measure a maximum projecting distance or maximum recessed distance of the 3D image by displaying the 3D image and outputting light beams which are overlapped with the displayed 3D image, parallel to the display panel unit, and arranged at a constant interval from the display panel unit.

When the change B in the distance between the pupils during viewing the real object is the same as the change A in the distance between the pupils during viewing of the 3D image, the measurement of the projecting distance or recessed distance of the real object (S230 to S250) measures the distance between the pupils when the real object is located on the display panel unit and sets it as a reference distance between pupils, measures a change in distance between pupils of an experimenter with respect to the reference distance between the pupils by moving the real object to project from or to be recessed into the display panel unit, and measures the distance of the projecting distance or recessed distance of the real object when the measured change in the distance between the pupils coincides with the change in the distance between the pupils of the 3D image.

Here, the change in the distance between the pupils is calculated by measuring the distance between the pupils of both eyes by taking an image of the eyes of the experimenter by a precision camera.

Accordingly, the method for measuring the depth of the 3D image according to the present invention can quantitatively represent the projecting distance or recessed distance of the same 3D image which is perceived by the plurality of experimenters and further calculate an objectified depth value of the 3D image by directly measuring the projecting distance or recessed distance of the real object so as to exclude the subjective effect on the perception of the depth of the 3D image.

The apparatus for measuring the depth of the 3D image according to the present invention may include a processor, a memory, a storage device, and an input/output device as components. These components can, for example, be interconnected using a system bus.

The processor is capable of processing instructions for execution within the apparatus. In one implementation, the processor is a single-threaded processor. In another implementation, the processor is a multi-threaded processor. The processor is capable of processing instructions stored in the memory or on the storage device.

Meanwhile, the memory stores information within the apparatus. In one implementation, the memory is a computer-readable medium. In one implementation, the memory is a volatile memory unit. In another implementation, the memory is a non-volatile memory unit.

The storage device is capable of providing mass storage for the apparatus. In one implementation, the storage device may include a hard disk device, an optical disk device, or any other mass storage.

The input/output device provides input/output operations for the apparatus according to the present invention. In one implementation, the input/output device may include one or more network interface devices such as an Ethernet card, serial communication devices such as an RS-232 port, and/or wireless interface devices such as an 802.11 card. In another implementation, the input/output device may include a driver device such as a keyboard, a printer, and a display device, configured to transmit output data and receive input data to and from another input/output device.

The apparatus according to the present invention can be operated according to instructions to cause one or more processes to perform the above-described functions and processors. Such instructions may include, for example, interpreted instructions, such as script instructions, e.g., JavaScript or ECMAScript instructions, or executable code, or other instructions stored in a computer readable medium. Moreover, the apparatus according to the present invention can be distributively implemented over a network, such as a server farm, or can be implemented in a single computer device.

Although an exemplary apparatus has been described in the specification and drawings, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of the apparatus according to the present invention.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As such, it is appreciated that the present invention can be carried out in other specific forms without changing a technical idea or essential characteristics by one having ordinary skilled in the art to which the present invention pertains to. Therefore, embodiments described above are for illustration purpose in all respect but not limited to them. The scope of the present invention is represented by claims described below rather than the detailed description, and any change and variations derived from the meaning, the scope and the concept of equality of claims should be interpreted to be included to the scope of the present invention.

INDUSTRIAL APPLICABILITY

The apparatus and method for measuring the depth of the 3D image according to the present invention is applicable to an apparatus for representing the depth value of the 3D image as a quantitative numerical value and an apparatus for adjusting the depth of the 3D image using the same.

The invention claimed is:

1. An apparatus for measuring the depth of a three-dimensional (3D) image, the apparatus comprising:
a display panel unit which produces a 3D image by displaying a left-eye image and a right-eye image;
a depth measurement unit which measures projecting distances or recessed distances of the 3D image and a real object;
a parallax measurement unit which measures a distance between pupils of an experimenter based on the projecting distances or recessed distances of the 3D image and the real objects; and
a depth value calculation unit which calculates an average value of the projecting distances or recessed distances of the real object with respect to a plurality of experimenters, which are measured when a change in distance between pupils is the same as a change in distance between pupils measured by adjusting the projecting distance or recessed distance of the 3D image, and determines the calculated average value as a depth value of the 3D image.

2. The apparatus of claim 1, further comprising a memory which stores the projecting distances or recessed distances of the 3D image and the real object, the distance between the pupils, and the depth value of the 3D image.

3. The apparatus of claim 1, wherein the depth measurement unit measures the projecting distance or recessed distance of the 3D image produced by the display panel unit using light beams, which are parallel to the display panel unit and arranged at a constant interval from the display panel unit, and measures the projecting distance or recessed distance of the real object by moving the real object with respect to the display panel unit.

4. The apparatus of claim 1, wherein the parallax measurement unit measures the distance between the pupils of both eyes by taking an image of the eyes of the experimenter by a precision camera.

5. The apparatus of claim 1, wherein the depth measurement unit measures the projecting distances or recessed distances of the 3D image and the real object with respect to the display panel unit, and wherein the depth value calculation unit measures the change in the distance between the pupils based on a distance between pupils when the 3D image or the real object is located on the display panel unit.

6. A method for measuring the depth of a three-dimensional (3D) image, the method comprising the steps of:
(a) measuring a projecting distance or recessed distance of a 3D image projecting from or recessed into a display panel unit and a change in distance between pupils;
(b) measuring a projecting distance or recessed distance of a real object when a change in distance between pupils is the same as the measured change in the distance between the pupils by moving the real object from the display panel unit; and
(c) calculating an average value of the projecting distances or recessed distances of the real object with respect to a plurality of experimenters, which are measured in steps (a) and (b), and determining the calculated average value as a depth value of the 3D image.

7. The method of claim 6, wherein step (a) comprises the steps of:
(a-1) displaying, at the display panel unit, a 3D image including a left-eye image and a right-eye image;
(a-2) outputting light beams parallel to the display panel unit and arranged at a constant interval from the display panel unit;
(a-3) measuring the projecting distance or recessed distance of the 3D image produced by the display panel unit using the light beams; and
(a-4) measuring a change in distance between pupils of an experimenter viewing the 3D image.

8. The method of claim 6, wherein step (b) comprises the steps of:
(b-1) measuring a distance between pupils when the real object is located on the display panel unit;
(b-2) measuring a change in distance of pupils of an experimenter by moving the real object to project from or to be recessed into the display panel unit; and
(b-3) measuring a distance of the projecting distance or recessed distance of the real object when the measured change in the distance between the pupils coincides with the change in the distance between the pupils of the 3D image.

9. The method of claim 6, wherein in step (a) or (b), the change in the distance between the pupils is calculated by measuring the distance between the pupils of both eyes by taking an image of the eyes of the experimenter by a precision camera.

* * * * *